F. F. WAECHTER.
EQUALIZING WHEELS.
APPLICATION FILED DEC. 12, 1908.
966,272.
Patented Aug. 2, 1910.
2 SHEETS—SHEET 1.
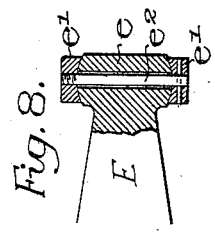
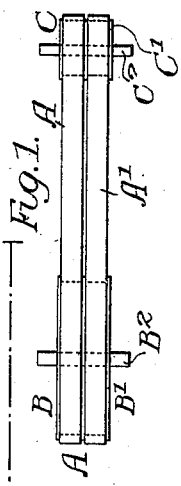
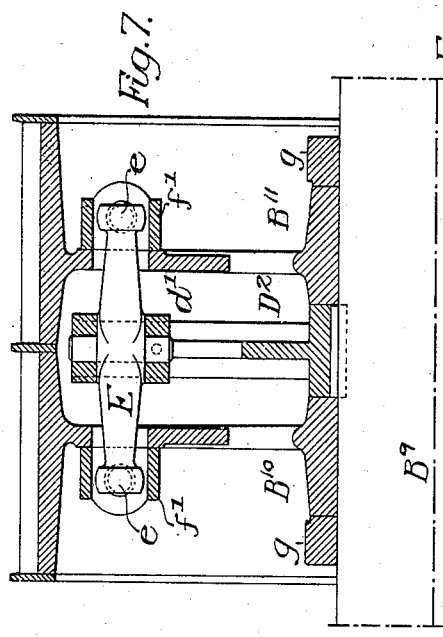
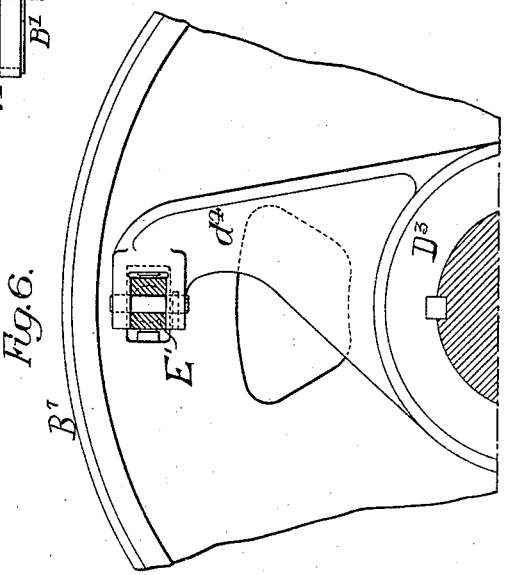
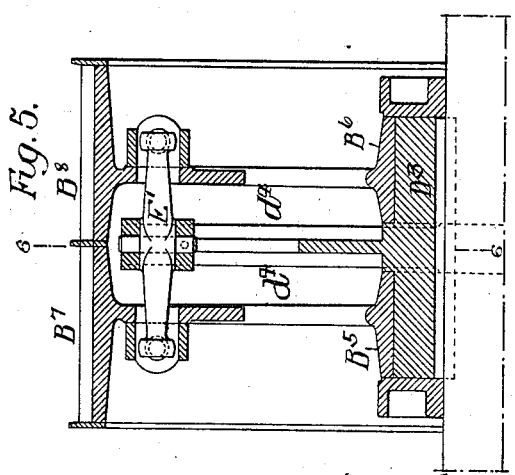
Witnesses:-
William H. Rivois
Wills H. Burrowes
Inventor:-
Ferdinand F. Waechter.
by his Attorneys
Howson & Howson

F. F. WAECHTER.
EQUALIZING WHEELS.
APPLICATION FILED DEC. 12, 1908.

966,272.

Patented Aug. 2, 1910.
2 SHEETS—SHEET 2.

Witnesses—

Inventor—
Ferdinand F. Waechter
by his Attorneys—

UNITED STATES PATENT OFFICE.

FERDINAND F. WAECHTER, OF PHILADELPHIA, PENNSYLVANIA, ASSIGNOR TO LINK-BELT COMPANY, OF CHICAGO, ILLINOIS, A CORPORATION OF ILLINOIS.

EQUALIZING-WHEELS.

966,272.  Specification of Letters Patent.  Patented Aug. 2, 1910.

Application filed December 12, 1908. Serial No. 467,195.

*To all whom it may concern:*

Be it known that I, FERDINAND F. WAECHTER, a citizen of the United States, residing in Philadelphia, Pennsylvania, have invented certain Improvements in Equalizing-Wheels, of which the following is a specification.

My invention relates to certain improvements in sprocket wheels which are arranged to receive two or more independent drive chains, said wheels being intended to drive the same shaft or to be driven by the same shaft.

It is now the common practice, instead of having a very wide single drive chain, to have two or more narrow chains; the chains being situated side by side and passing around wheels of the same diameter mounted on the same shaft, so that the drive is through both chains, but in this type of drive the chains must be accurately mated so that one will not be subjected to a greater strain than the other and even with the greatest care it is almost impossible to drive evenly through both chains.

The object of my invention is to provide a compensating wheel which will correct the unevenness of the drive, so that the tension will be equal on both chains and one chain will not be subjected to a greater strain than the other.

Figure 3:
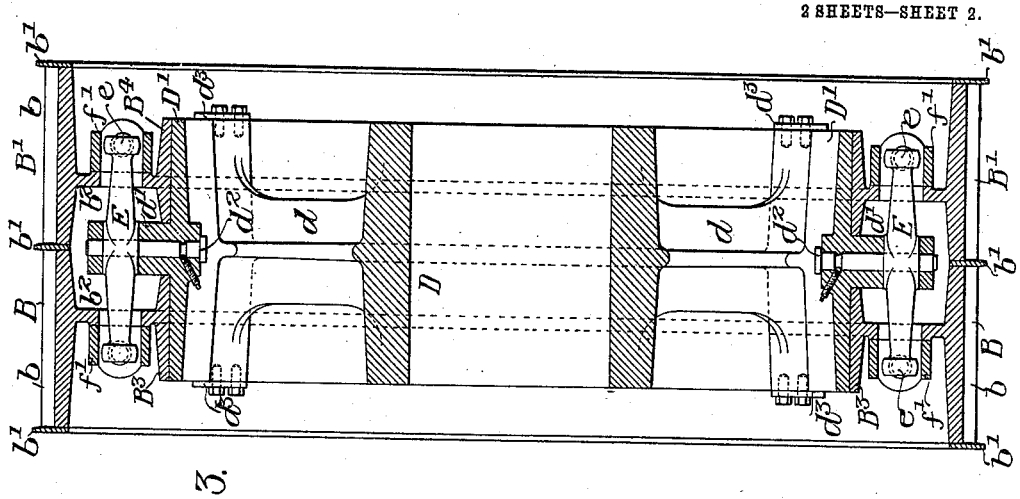
Figure 2:
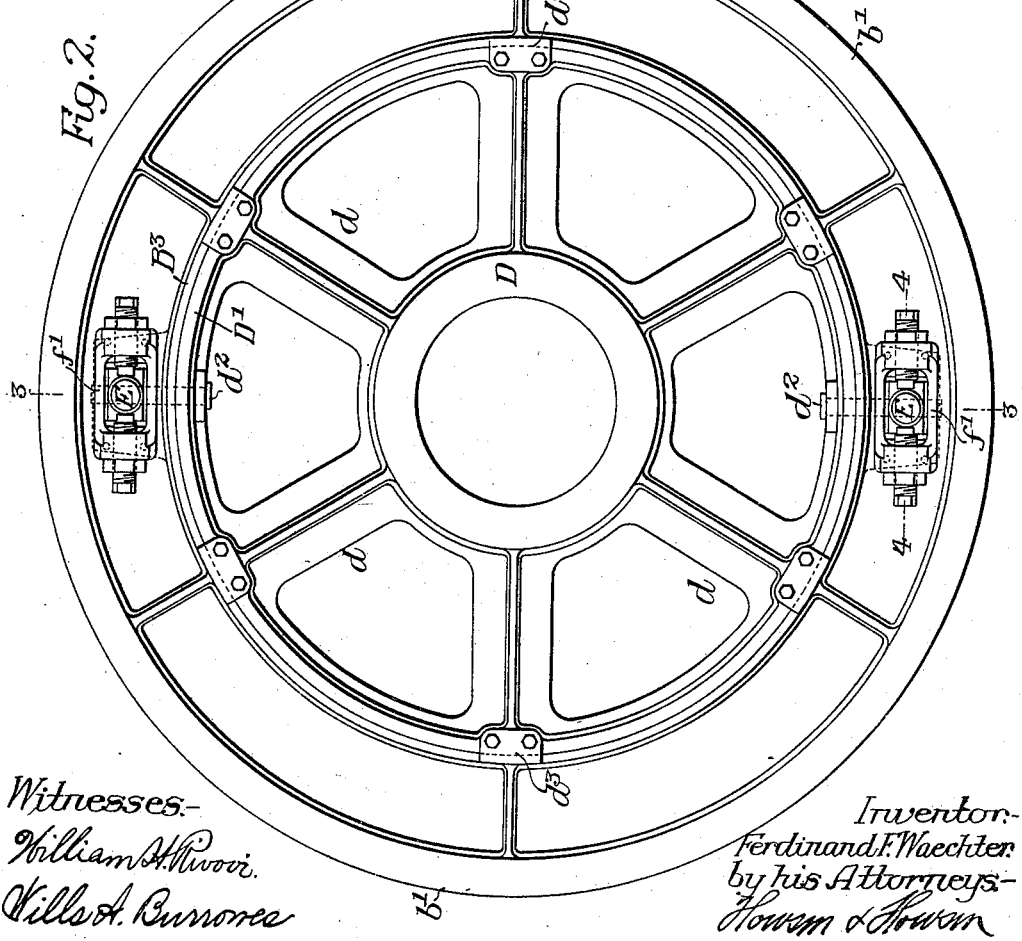

In the accompanying drawings:—Figure 1, is a diagram plan view showing two chains situated side by side and sprocket wheels over which the chains pass; Fig. 2, is an enlarged side view of one of the sprocket wheels; Fig. 3, is a sectional view on the line 3—3, Fig. 2; Fig. 4, is a sectional view on the line 4—4, Fig. 2; Fig. 5, is a sectional view of a modification; Fig. 6, is a sectional view on the line 6—6, Fig. 5; and Figs. 7 and 8, are views illustrating other modifications of the invention.

Referring to Fig. 1, A, A′ are the two drive chains situated side by side, and C, C′ are the driving sprocket wheels mounted on a shaft $C^2$. B, B′ are the driven sprocket wheels mounted on a shaft $B^2$.

My invention is particularly adapted for use in connection with toothed drive chains in which the teeth on the drive chains engage bearing surfaces on the wheels.

Referring particularly to Figs. 2, 3 and 4, B, B′ are the two sprocket wheels having sprocket teeth $b$ and provided, in the present instance, with flanges $b′$. D is a hub connected by spokes $d$ to a rim D′ on which are mounted the hubs $B^3$, $B^4$ of the wheels B, B′; these hubs are capable of free rotation on the rim D′. The hubs $B^3$, $B^4$ of the wheels B, B′ are mounted between centrally situated bearings $d′$ and plates $d^3$ secured to the rim. There are two bearings in the present instance and each bearing has a transverse opening for the reception of equalizing levers E which are mounted on pins $d^2$ projecting radially through the bearing $d′$, as indicated clearly in Fig. 3. The ends of the arms of each equalizing lever E are rounded as at $e$ and are mounted between the ends of set screws $f, f$ forming bearing points; said set screws being carried by brackets $f′$ secured to the webs $b^2$ of the wheels B, B′, so that in case one or the other of the chains A, A′ is under tension more than the other the equalizing levers E will immediately correct this deficiency and one wheel will be moved slightly in advance of the other until both chains are under the same tension. It requires a very slight independent movement of the wheels to correct the deficiency. When wheels of large size are used the ends of the arm E may be provided with shoes $e′$, preferably connected together by a rod $e^2$ passing through an enlarged hole in each end of the arm, as shown in Fig. 8, so as to provide a large bearing for the set screws. The rims of wheels B, B′ are extended in the present instance, and practically abut one with the other and thus inclose the equalizing levers.

In Figs. 5 and 6, I have shown a slight modification in which the hubs $B^5$ and $B^6$ of the wheels $B^7$, $B^8$ are mounted directly on the hub D, and the bearings which support the levers E are extended as at $d^4$, and preferably curved as shown in Fig. 6.

In Fig. 7, I have shown the bearings mounted on a separate ring $D^2$ keyed to the shaft $B^9$, and the hubs $B^{10}$, $B^{11}$ mounted directly on the shaft. In this instance collars $g$ are secured to the shaft to retain the wheel sections in position.

Thus it will be seen, by the use of any of the modifications, the unevenness of drive is readily corrected.

I claim:—

1. The combination of a hub, bearings projecting from the hub, a lever mounted in each bearing, two wheels, one on each side of the bearings, and set screws carried by the wheels acting as bearing points against which the ends of the levers rest.

2. The combination of a shaft, a hub thereon, a rim connected to the hub, bearings projecting radially from the rim, two wheels each having hubs mounted on the said rim one on each side of the bearing, each bearing having a transverse opening, a two-armed lever extending through each opening, a radial pivot pin in each bearing on which the lever is mounted, the ends of each lever being rounded, said wheels having openings into which the ends of the levers extend, and set screws mounted in the wheels and forming adjustable bearings for the levers.

3. The combination of a hub, an equalizing lever pivoted to the hub, two wheels, brackets on the wheels into which the arms of the lever extend, and set screws carried by each bracket and engaging the arms of the lever.

In testimony whereof, I have signed my name to this specification, in the presence of two subscribing witnesses.

FERDINAND F. WAECHTER.

Witnesses:
WM. E. SHUPE,
WM. A. BARR.